United States Patent [19]

Schemelin et al.

[11] Patent Number: 5,094,326
[45] Date of Patent: Mar. 10, 1992

[54] CONTROL LINKAGE FOR HYDROSTATIC TRANSMISSION

[75] Inventors: Michael P. Schemelin, West Bend; Kenneth H. Klas; Daniel W. Schaefer, both of Port Washington, all of Wis.

[73] Assignee: Simplicity Manufacturing, Inc., Port Washington, Wis.

[21] Appl. No.: 587,321

[22] Filed: Sep. 24, 1990

[51] Int. Cl.⁵ .................. B60K 41/22; B60K 20/00
[52] U.S. Cl. ............................ 192/363; 74/473 R; 74/474; 192/4 A; 192/4 C
[58] Field of Search ................ 74/473 R, 474; 192/3.63, 4 R, 4 A, 4 C

[56] References Cited

U.S. PATENT DOCUMENTS

| | | | |
|---|---|---|---|
| 4,064,766 | 12/1977 | Rinaldo | 74/473 R |
| 4,281,737 | 8/1981 | Molzahn | 192/4 A X |
| 4,296,846 | 10/1981 | Benson | 192/4 C X |
| 4,491,209 | 1/1985 | Bening | 192/13 R X |
| 4,496,035 | 1/1985 | Wanie | 74/474 X |
| 4,759,417 | 7/1988 | Wanie et al. | 74/474 X |
| 4,771,856 | 9/1988 | Hutchison et al. | 74/473 X |
| 4,799,397 | 1/1989 | Egidi et al. | 74/473 R |
| 4,955,249 | 9/1990 | Wetor | 74/474 X R |

Primary Examiner—Allan D. Herrmann
Assistant Examiner—David W. Laub
Attorney, Agent, or Firm—Reinhart, Boerner, Van Deuren, Norris & Rieselbach

[57] ABSTRACT

A control linkage for controlling the speed and direction of a hydrostatic transmission in a lawn and garden tractor. A directional control arm, coupled to a dash mounted direction and speed control lever, pivots relative to the hydrostatic transmission in response to movement of the direction and speed control lever. A cam roller on the directional control arm engages a cam plate mounted on the control input shaft of the hydrostatic transmission so as to rotate the control input shaft in response to movement of the direction and speed control lever. A detent adjacent the transmission and engaging the cam plate fixes the position of the cam plate to eliminate backlash and avoid vehicle "creep" when the direction and speed control lever is placed in "neutral." An additional cam, responsive to engagement of a vehicle clutch/brake system automatically places the transmission in "neutral" when the clutch/brake system is engaged.

14 Claims, 4 Drawing Sheets

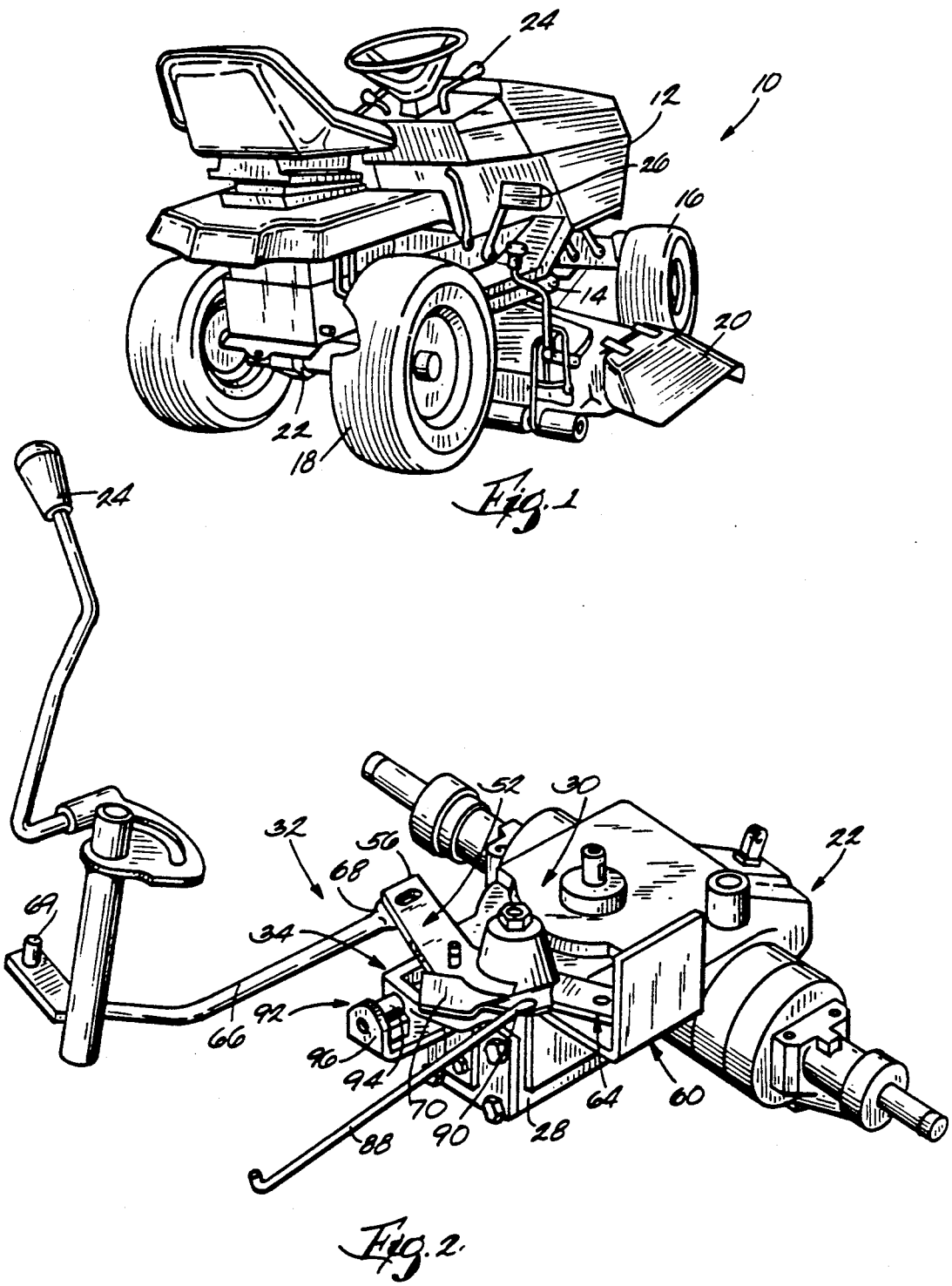

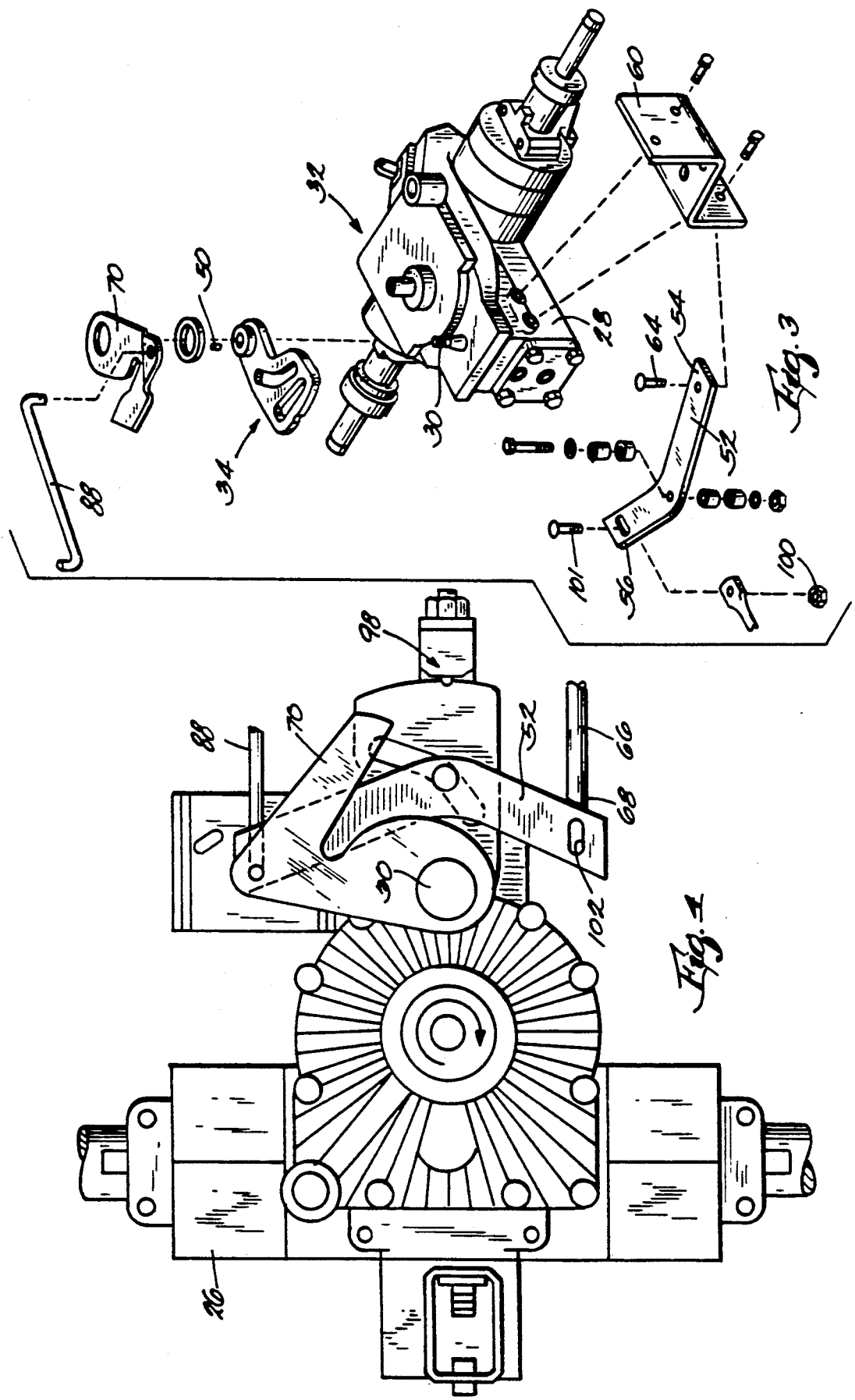

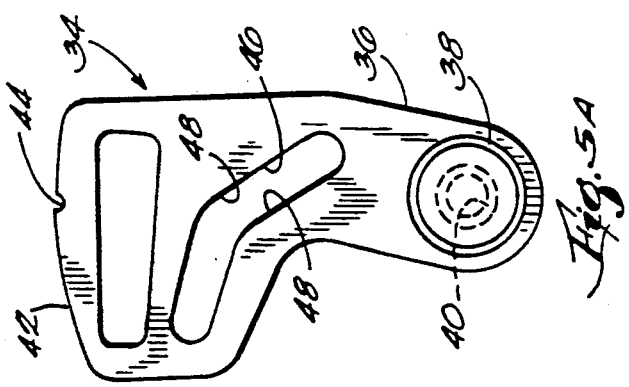
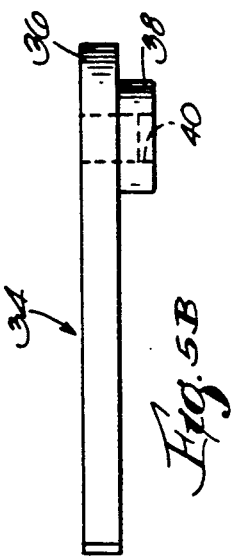
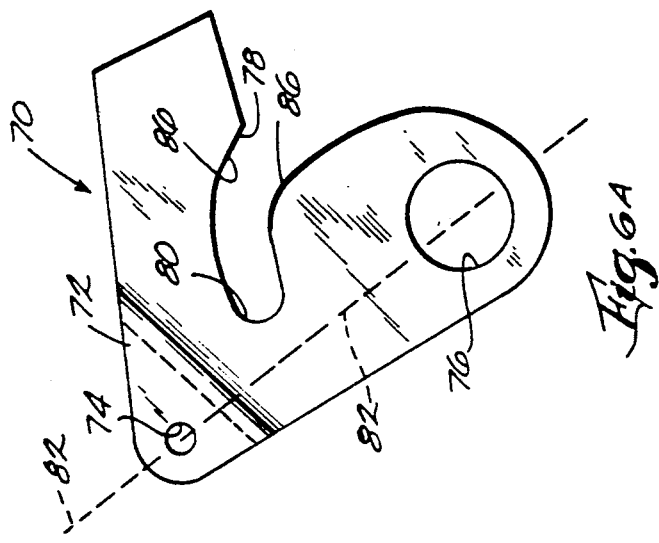
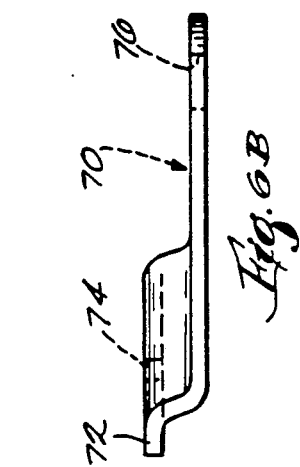
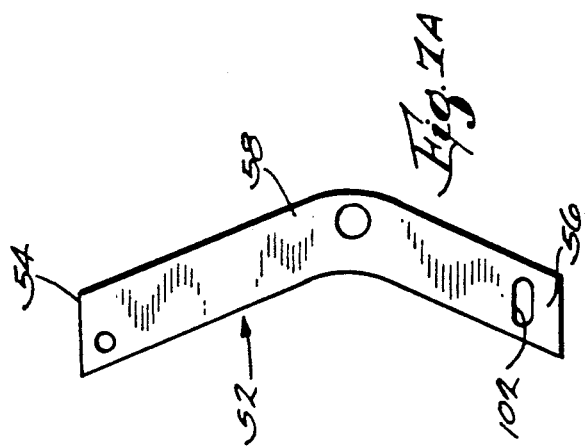
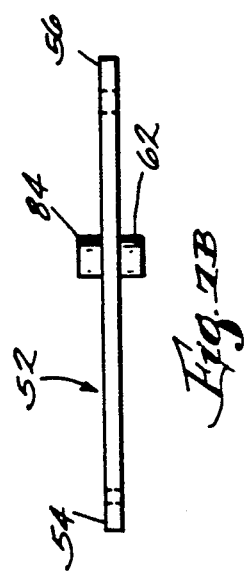

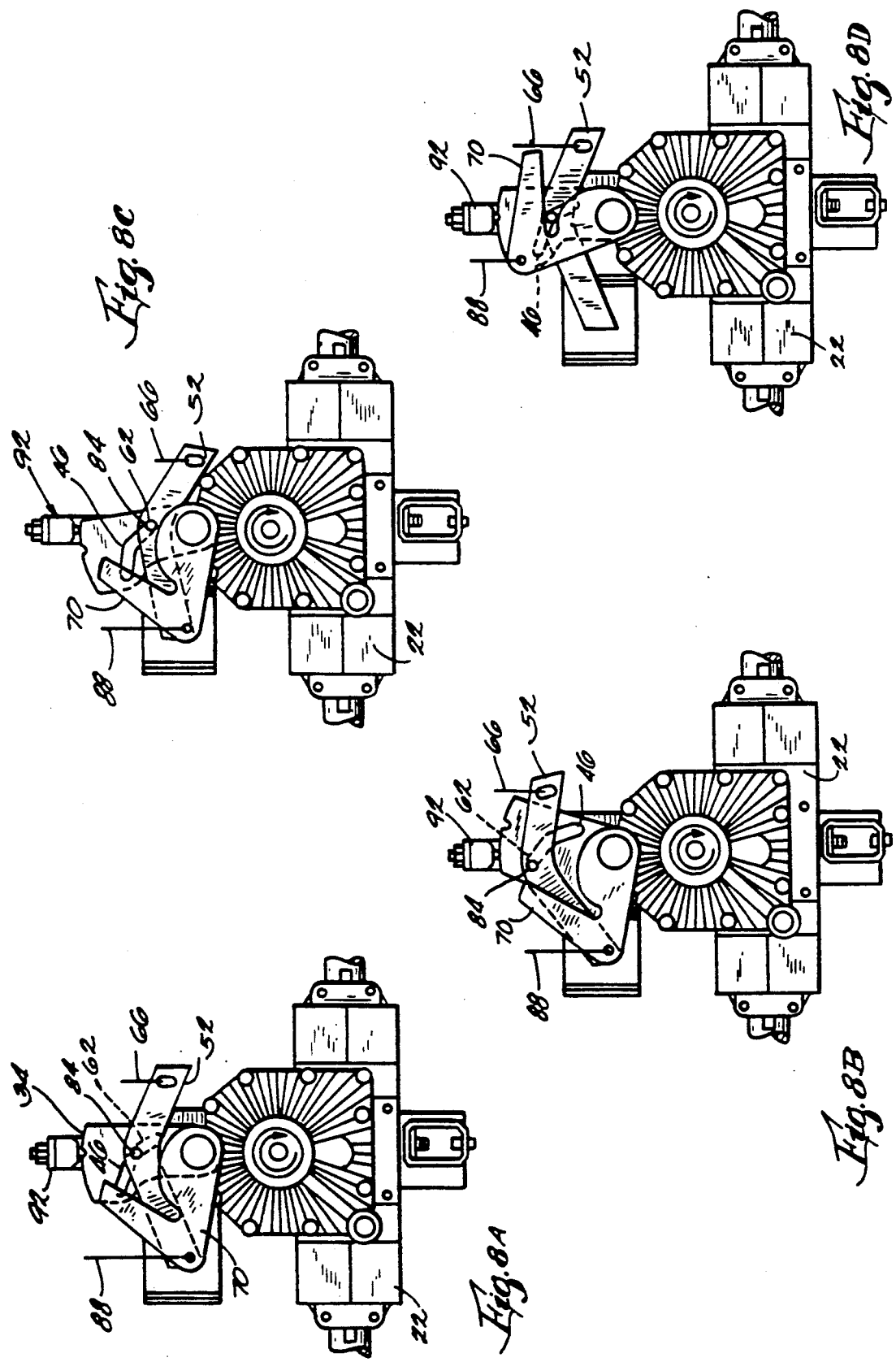

5,094,326

CONTROL LINKAGE FOR HYDROSTATIC TRANSMISSION

BACKGROUND OF THE INVENTION

This invention relates generally to lawn and garden tractors and, more particularly, to control linkages for hydrostatic transmissions in such lawn and garden tractors.

Hydrostatic or hydraulic transmissions are used to advantage in lawn and garden tractors. Such transmissions are reliable, economical, durable and require little maintenance. Furthermore, in contrast to conventional transmissions that provide a limited number of fixed gear ratios, hydrostatic transmissions provide an infinitely variable speed range. This capability avoids the need to shift gears and simplifies vehicle operation. In addition, the continuous range of available speeds allows the operator to operate the vehicle at an optimum speed under all conditions of load.

Typically, hydrostatic transmissions include a rotatable control input shaft that governs how fast, and in what direction, the transmission operates. The resulting vehicle speed and direction of travel is determined by the rotational position of the control input shaft.

In contrast to conventional transmissions having gears that can be disengaged in a positive manner, hydrostatic transmissions vary hydraulic flow rates to obtain infinitely variable speeds. Accordingly, hydrostatic transmissions cannot be disengaged or placed in "neutral" in the same manner that a geared transmission can. Rather, "neutral" in a hydrostatic transmission corresponds to that setting of the control input shaft that balances the hydraulic fluid flow rates and results in no vehicle movement in either direction. The "neutral" setting in a hydrostatic transmission thus corresponds to a precise setting that frequently has very little "width" or tolerance. Accordingly, it is common for vehicles equipped with hydrostatic transmissions to move slowly or "creep" in one direction or another even though the vehicle has been placed in "neutral".

One possible source of vehicle creep is backlash in the control linkage that links the transmission control input shaft with a user-operated transmission control lever that typically is located adjacent the driver's position. Even though the operator places the control lever in a position marked "neutral", backlash in the linkage allows the transmission control input shaft to deviate slightly from the true "neutral" position. Vehicle creep is the result.

In view of the foregoing, it is a general object of the present invention to provide a new and improved control linkage for hydrostatic transmissions.

It is a further object of the present invention to provide a new and improved control linkage for hydrostatic transmissions that avoids vehicle creep when the vehicle is in "neutral".

It is a still further object of the present invention to provide a control linkage that minimizes or avoids the difficulties associated with backlash in the linkage system.

SUMMARY OF THE INVENTION

The invention provides a control linkage for controlling the speed and direction of a vehicular hydrostatic transmission of the type having a rotatable control input shaft. The control linkage comprises a directional control cam that is mounted on the control input shaft and has a slot defining a cam surface. The control linkage further comprises a directional control are having an outer end, an inner end pivotally connected to the hydrostatic transmission and a cam roller between the inner and the outer ends. The cam roller is received in the cam slot. A directional control rod is connected at one end to the outer end of the directional control arm, and a user-actuable control lever is coupled to the remaining end of the directional control rod. The control lever is operable to displace the directional control rod so as to pivot the control arm relative to the hydrostatic transmission. The roller and cam surface cooperate during the pivoting movement of the control arm to displace the control cam to rotate the control input shaft in accordance with the position of the user-actuable control lever.

The invention also provides a vehicle that includes a hydrostatic transmission having a direction and speed control input shaft. The vehicle further comprises a directional control cam that is mounted on the direction and speed control input shaft and has a cam surface. The vehicle further comprises a directional control arm having an outer end, an inner end pivotally connected to the hydrostatic transmission and a cam roller between the inner and outer ends and engaging the cam surface. A user-actuable control is coupled to the directional control arm for controllably pivoting the control arm around the pivotally connected inner end. The inner end, the cam roller and the cam surface are located and shaped so that movement of the cam roller in response to pivoting movement of the control arm displaces the cam surface to rotate the control arm and thereby rotate the input shaft connected to the control cam in response to pivoting movement of the control arm.

In one embodiment, the control input shaft has a neutral position, a maximum forward speed position and maximum reverse speed position. The cam surface is shaped so that the ratio of use-actuable control lever movement to control input shaft rotation varies from a minimum, when the control input shaft is in the neutral position, to a maximum, when the control input shaft is in either the maximum forward speed or maximum reverse speed position.

In one embodiment, the control linkage further includes a detent adjacent the hydrostatic transmission for placing and retaining the control input shaft in the neutral position when the use-actuable control lever is moved so as to place the control input shaft near the neutral position.

In one embodiment, the vehicle includes a user-actuable clutch/brake system, and the control linkage further includes a return to neutral structure for placing the control input shaft in the neutral position when the clutch/brake system is engaged.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a lawn and garden tractor having a hydrostatic transmission control linkage embodying various features of the invention.

FIG. 2 is a fragmentary perspective view of a control linkage embodying various features of the invention showing the control linkage in place on a hydrostatic transmission.

FIG. 3 is an exploded perspective view of the control linkage shown in FIG. 2.

FIG. 4 is a top plan view of one portion of the control linkage showing the control linkage in place on the hydrostatic transmission.

FIGS. 5A and 5B are top plan and side elevation views, respectively, of a directional control cam constructed in accordance with one aspect of the invention.

FIGS. 6A and 6B are top plan and side elevation views, respectively, of a return to neutral cam constructed in accordance with one aspect of the invention.

FIGS. 7A and 7B are top plan and side elevation views, respectively, of a directional control arm constructed in accordance with one aspect of the invention.

FIGS. 8A-8D are top plan views, similar to FIG. 4, useful in understanding the operation of the control linkage and showing the control linkage in various control settings.

DESCRIPTION OF THE PREFERRED EMBODIMENT

Referring to the drawings, a lawn and garden tractor 10 embodying various features of the invention is illustrated in FIG. 1. The tractor comprises a prime mover, such a gasoline engine 12, mounted on a frame 14. The frame 14 supports a pair of front wheels 16 and a pair of rear wheels 18. A mower deck 20 is suspended beneath the frame 14 between the front and rear wheels. A hydrostatic transmission 22 of known construction is mechanically coupled to the engine 12 and turns the rear wheels 18 to propel the tractor. A dash mounted direction and speed or directional/speed control lever 24 enables the operator to set the vehicle speed and direction of travel. A combined clutch/brake pedal 26 functions, when depressed, to bring the tractor to a stop.

Referring further to FIGS. 2-4, the hydrostatic transmission 22 includes a transmission housing 28 and a directional/speed control input shaft 30 extending upwardly from the housing 28. The rotational position of the control input shaft 30 governs the speed and direction of the vehicle's movement. In the illustrated embodiment, full rotation of the control input shaft 30 in the clockwise direction as viewed in FIGS. 2 and 4 results in full speed movement of the vehicle in the forward direction. Similarly, full rotation of the control input shaft 30 in the counterclockwise direction results in full speed vehicle movement in the reverse direction. As the control shaft 30 is rotated from one extreme position to the other, vehicle speed progressively decreases until a "neutral" position is reached wherein the vehicle stops. Continued rotation of the input shaft 30 causes the vehicle to move with increasing speed in the opposite direction.

In accordance with one aspect of the invention, the tractor 10 includes a control linkage 32 that translates fore and aft movement of the directional/speed control lever 24 into rotational movement of the control input shaft 30. In addition, the control linkage 32 responds to engagement of the clutch/brake system to automatically place the transmission 22 in "neutral" when the clutch/brake pedal 26 is depressed. This "return to neutral" feature enhances vehicle safety by requiring the operator to once again manipulate the directional/speed lever 24 before the vehicle will move.

The construction of the control linkage 32 is best illustrated in FIGS. 2 through 7. As illustrated, the control linkage 32 includes a directional control cam 34 that is mounted on, and co-rotatable with, the directional speed control input shaft 32. As illustrated in FIGS. 5A and 5B, the directional control cam 34 comprises a generally planar plate having an arm portion 36 at one end. A cylindrical boss 38 extends downwardly from the distal end of the arm 36 and includes a keyed aperture 40 for receiving therethrough the end of the control input shaft 30. Opposite the arm 36, the directional control cam 34 includes an arcuate outer edge 42 having therein formed a notch or depression 44. A doglegged cam slot 46 is formed in the directional control cam 34 between the arm 36 and the outer edge 42 to define a pair of substantially equidistantly spaced cam surfaces 48. A key and keyway arrangement 50 (FIG. 3) secures the directional control cam 34 for co-rotation with the control input shaft 30. The directional control cam 34 is oriented so that the arcuate outer edge 42 extends forwardly of the transmission housing 28.

The control linkage 32 further includes a directional control are 52 that, as shown in FIGS. 7A and 7B, comprises an elongate angular member having a pair of opposite ends 54, 56 and a middle portion 58 therebetween. One end 54 of the directional control arm 52 is pivotally mounted to a bracket 60 (FIG. 3) that in turn is mounted to the side of the transmission housing 28. The directional control arm 52 is oriented in a substantially horizontal plane so that the middle portion 58 extends substantially over and parallel with the cam slot 46 of the directional control cam 34. A downwardly depending cam roller 62 is mounted to the middle portion 58 of the directional control arm and is received in the slot 46 of the directional control cam 34. The slot 46 is shaped and oriented so that rotation of the directional control arm 52 around its pivot point 64 cams the directional control cam 34 so as to rotate the control input shaft 30.

The remaining end 56 of the directional control arm 52 projects beyond the side of the transmission housing 28 and is connected to one end 68 of a directional control rod 66. The remaining end 69 of the directional control rod 66 is coupled to the directional/speed control lever 24 so that movement of the lever 24 results in fore and aft movement of the directional control rod 66. Such movement rotates the direction control arm 52 around its pivot 64 causing the cam roller 62 to displace the directional control cam and thereby to turn the control input shaft 30.

To implement the "return to neutral" feature that automatically places the transmission 22 in "neutral" when the clutch/brake system is engaged, the control linkage 32 further includes a return to neutral cam 70. The return to neutral cam 70, which is shown in detail in FIGS. 6A and 6B, comprises a plate having a raised tab 72 at one corner. An aperture 74 is formed through the raised corner 72. The return to neutral cam 70 further includes a pivot aperture 76 at another corner for mounting the cam 70 over the end of the control input shaft 30 and over the directional control arm 52 and directional control cam 34. In contrast to the directional control cam 34, however, the return to neutral cam 70 is rotatable independently of the control input shaft 30.

The return to neutral cam 70 is oriented so that the raised corner 72 is positioned forward and outward of the control input shaft as shown.

In accordance with one aspect of the invention, the return to neutral cam 34 further includes an arcuate slot 78 that opens through the side of the cam 70 and tapers toward a closed end 80 terminating adjacent a radius 82 extending from the pivot aperture 76 through the aperture 74 in the raised corner 72. An additional, upwardly extending cam roller 84 is mounted to the middle portion 58 of the directional control arm 52 and is received in the slot 78 as the return to neutral cam 70 pivots around the control input shaft 30. The slot 78 thus defines a pair of cam surfaces 86 that engage the upwardly extending cam roller 84 and move the directional control arm 52 as the return to neutral cam 70 pivots around the control input shaft 30.

The aperture 74 formed in the raised corner 72 of the return to neutral cam 70 engages one end 90 of a return to neutral rod 88 that is connected to the clutch/brake system. In the illustrated embodiment, engagement of the clutch/brake system pulls the return to neutral rod 88 forward causing the return to neutral cam 70 to rotate in the clockwise direction as shown in FIGS. 2, 3 and 4.

As previously noted, "neutral" in a hydrostatic transmission 22 corresponds to a precise rotational position of the control input shaft 30. To assist in placing and retaining the control input shaft 30 in the neutral position, the control linkage 32 further includes a detent mechanism 92 that functions to fix the position of the control input shaft 30 when the directional/speed control lever 24 is placed in the "neutral" position. In the illustrated embodiment, the detent mechanism 92 includes a spring-biased ball detent assembly 94 that is mounted to a bracket 96 adjacent the forward end of the transmission housing 28.

The detent mechanism 92 is positioned adjacent, and faces toward, the arcuate outer face 42 of the directional control cam 34. When the control input shaft 30 (and, accordingly, the directional control cam 34) is in the "neutral" position, the spring-biased ball 98 drops into the notch 44 formed in the outer arcuate surface 42 of the directional control cam 34. The detent mechanism 92 thus not only serves to help retain the control input shaft 30 in the "neutral" position, but also helps to define the position itself. Because the "neutral" position is defined at the hydrostatic transmission 22 itself, rather than at the directional/speed control lever 24, backlash in the linkage between the directional/speed control lever 24 and the directional control arm 52 does not affect the "neutral" setting of the transmission 22.

Preferably, the spring-biased ball detent assembly 94 is eccentrically mounted on its bracket 96 so that its tangential position relative to the control input shaft 30 can be varied over a small range. This permits a precise adjustment of the "neutral" setting. In addition, the directional control rod 66 is coupled to the end 56 of the directional control arm 52 by means of a nut 100 and bolt 101 extending through an elongated slot 102 formed in the end 56 of the directional control arm 52. This permits coarse adjustment of the "neutral" setting provided by the directional/speed control lever 24. Similarly, the aperture in a directional control arm through which the pilot 64 extends can be enlarged to permit further adjustment. Once the directional/speed control lever 24 places the directional control cam 34 near the true "neutral" setting, the action of the detent mechanism 92 functions to place the directional control cam 34 precisely in the true "neutral" position.

The operation of the control linkage 32 can best be understood by reference to FIGS. 8A-8D. In FIG. 8A, the user-actuable directional/speed control lever 24 is in the "neutral" position and the clutch/brake mechanism is disengaged. The ball detent 92 engages the notch 44 in the arcuate outer face 42 of the directional control cam 34 to retain the control input shaft 30 in the "neutral" position. The return to neutral cam 70 is pushed back so that it remains clear of the upper cam roller 84 on the directional control arm 52.

In FIG. 8B, the directional/speed control lever 24 is in the "full forward" position, and the clutch/brake system is disengaged. Forward movement of the directional control rod 66 pivots the directional control arm 52 in the counterclockwise direction the lower cam roller 62 drives the directional control cam 34 in the clockwise direction. This causes the directional control cam 34 to rotate the control input shaft 30 in the clockwise direction the vehicle moves forward.

In FIG. 8C, the directional/speed control lever 24 is in the "full reverse" position. The directional control rod 66 has moved rearwardly toward the hydrostatic transmission 22 thereby rotating the directional control 52 arm in the clockwise direction. This results in counterclockwise rotation of the directional control cam 34 and the control input shaft 30. The vehicle moves backward.

In FIG. 8D, the clutch/brake system is engaged. This causes the return to neutral rod 88 to move forward thereby pivoting the return to neutral cam 70 in the clockwise direction. As the return to neutral cam 70 rotates, the cam surfaces 86 defined by the slot 78 engage the upper cam roller 84. Regardless of the initial setting of the directional/speed control lever 24, such rotation of the return to neutral cam 70 drives the directional control arm 52 and, accordingly, the directional control cam 34 to the position shown in FIG. 8D. This has the effect of placing the directional control cam 34, and the control input shaft 30 connected thereto, in the "neutral" position. Similarly, movement of the directional control arm 52 is transferred back to the directional/speed control lever 34 so that the lever 24 returns to the "neutral" position marked on the tractor dashboard. The slot 78 in the return to neutral cam 70 surrounds the upper cam roller 84, and "locks" the directional control arm 52 against further movement. This prevents movement of the directional/speed control lever 24 when the clutch/brake system is engaged. When the clutch/brake system is disengaged, the return to neutral cam 70 rotates back to the position shown in FIG. 8A.

The control linkage 32 herein shown and described provides many advantages. In particular, the linkage 32 is manufactured of relatively few, durable parts that are economical to manufacture and that provide reliable service. In addition, the detent mechanism 92 that defines the "neutral" position is adjacent the hydrostatic transmission 22. This eliminates the imprecision caused by backlash in the link to the directional/speed control lever 24. Finally, the cam surfaces 48 in the directional control cam 34 can be shaped so as to provide a non-linear response of the control input shaft 30 to movement of the directional/speed control lever 24. In other words, the ratio of control lever movement to control input shaft rotation can vary depending on the control lever setting. For example, the slot 46 in the directional control cam 34 can be shaped as shown to provide finer speed control adjacent the "neutral" position than when the tractor 10 is operating at its full forward speed. This provides more precise control at lower speeds where fine speed control is of greater importance. Similarly, for safety reasons, the cam surfaces 48 can be shaped so that the maximum available reverse speed is less than the maximum available forward speed.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A control linkage for controlling the speed and direction of a vehicular hydrostatic transmission of the type having a rotatable control input shaft, said control linkage comprising:
   a directional control cam mounted on the control input shaft and having a slot defining a cam surface;
   a directional control arm having an outer end, an inner end pivotally connected to said hydrostatic transmission and a cam roller between said inner and outer ends and received in said slot;
   a directional control rod connected at one end to said outer end of said directional control arm; and
   a user-actuable control lever coupled to the remaining end of said directional control rod and operable to displace said directional control rod so as to pivot said directional control arm relative to said hydrostatic transmission;
   said roller and said cam surface cooperating during pivoting movement of said directional control arm to displace said control cam and thereby rotate the control input shaft in accordance with the position of said user-actuable control lever.

2. A control linkage as defined in claim 1 wherein the control input shaft has a neutral position, a maximum forward speed position and a maximum reverse speed position, and wherein said cam surface is shaped so that the ratio of user actuable control lever movement to control input shaft rotation varies from a minimum when said control input shaft is in said neutral position to a maximum when said control input shaft is in either said maximum forward speed position or said maximum reverse speed position.

3. A control linkage as defined to claim 1 wherein said control linkage further comprises detent means adjacent the hydrostatic transmission for placing and retaining the control input shaft in said neutral position when said user-actuable control lever is moved so as to place the control input shaft near said neutral position.

4. A control linkage as defined in claim 3 wherein said detent means cooperates with said directional control cam to fix the position of said directional control cam and thereby retain the control input shaft in said neutral position.

5. A control linkage as defined in claim 4 wherein said detent means includes a depression formed in said directional control cam and further includes a spring-biased detent ball coupled to the hydrostatic transmission and located so as to engage said depression when the control input shaft is in the neutral position.

6. A control linkage as defined in claim 1 wherein the control input shaft has a neutral position, the vehicle includes a user-actuable clutch/brake system, and wherein said control linkage further includes a return to neutral means for placing the control input shaft in the neutral position when said clutch/brake system is engaged.

7. A control linkage as defined in claim 6 wherein said return to neutral means includes a return to neutral cam coupled to said directional control arm and further includes a return to neutral rod coupled to the clutch/brake system and to said return to neutral cam so as to rotate said return to neutral cam to turn said directional control arm and place the control input shaft in the neutral position in response to engagement of said clutch/brake system.

8. A control linkage ad defined in claim 7 wherein said return to neutral means further includes lock means responsive to movement of said return to neutral cam for securing the control input shaft in the neutral position while the clutch/brake system is engaged.

9. A control linkage as defined in claim 8 wherein control linkage includes an additional cam roller on said direction control arm and further comprises a cam surface formed in said return to neutral cam and engagable with said additional cam roller when said return to neutral cam is rotated in response to engagement of said clutch/brake system.

10. a vehicle comprising:
    a hydrostatic transmission having a direction and speed control input shaft;
    a directional control cam mounted on said direction and speed control input shaft and having a cam surface;
    a directional control arm having an outer end, an inner end pivotally connected to said hydrostatic transmission and a cam roller between said inner and outer ends and engaging said cam surface; and
    user-controllable means coupled to said directional control arm for controllably pivoting said directional control arm around said pivotally connected inner end;
    said inner end, said cam roller and said cam surface being located and shaped so that movement of said cam roller in response to pivoting movement of said directional control arm displaces said cam surface to rotate said directional control cam and thereby rotate said input shaft connected to said directional control cam in response to pivoting movement of said directional control arm.

11. A vehicle as defined in claim 10 wherein said control input shaft has a neutral position and wherein said vehicle further comprises detent means adjacent said hydrostatic transmission for placing and retaining said control input shaft in said neutral position when said user-controllable means places said control input shaft near said neutral position.

12. A vehicle as defined in claim 11 wherein said detent means cooperates with said directional control cam to fix the position of said directional control cam and thereby retain said control input shaft in said neutral position.

13. A vehicle as defined in claim 12 wherein said detent means includes a depression formed in said directional control cam and further includes a spring-biased ball coupled to said hydrostatic transmission and located so as to engage said depression when said control input shaft is in said neutral position.

14. A vehicle as defined in claim 10 wherein said control input shaft has a neutral position, wherein said vehicle includes a user-actuable clutch/brake system and wherein said vehicle further includes return to neutral means for placing said control input shaft in said neutral position when said clutch/brake system is engaged.

* * * * *